(12) United States Patent
Garcia-Luna-Aceves et al.

(10) Patent No.: US 7,159,035 B2
(45) Date of Patent: Jan. 2, 2007

(54) UNIFIED ROUTING SCHEME FOR AD-HOC INTERNETWORKING

(75) Inventors: J Joaquin Garcia-Luna-Aceves, San Mateo, CA (US); David A. Beyer, Los Altos, CA (US); Thane J. Frivold, Redwood City, CA (US)

(73) Assignee: Nokia Corporation, Espoo (FI)

( * ) Notice: Subject to any disclaimer, the term of this patent is extended or adjusted under 35 U.S.C. 154(b) by 427 days.

(21) Appl. No.: 10/256,168

(22) Filed: Sep. 25, 2002

(65) Prior Publication Data

US 2003/0037167 A1 Feb. 20, 2003

Related U.S. Application Data

(62) Division of application No. 09/221,228, filed on Dec. 23, 1998, now abandoned.

(51) Int. Cl.
G06F 15/16 (2006.01)

(52) U.S. Cl. ...................................... 709/241
(58) Field of Classification Search ................ 709/238, 709/241; 370/391, 204; 455/406, 437; 465/462
See application file for complete search history.

(56) References Cited

U.S. PATENT DOCUMENTS 4,466,060 A 8/1984 Riddle (Continued)

FOREIGN PATENT DOCUMENTS

| EP | 0465201 A2 | 1/1992 |
|---|---|---|
| EP | 0539737 A1 | 5/1993 |
| EP | 0845889 A2 | 6/1998 |

(Continued)

OTHER PUBLICATIONS

F.A. Tobagi and L. Kleinrock, "Packet switching in radio channels: Part II—the hidden terminal problem in carrier sense multiple-access modes and the busy-tone solution," IEEE Trans. Commun., vol. COM-23, No. 12, pp. 1417-1433 (1975).

(Continued)

*Primary Examiner*—Andrew Caldwell
*Assistant Examiner*—Stephan Willett
(74) *Attorney, Agent, or Firm*—Squire, Sanders & Dempsey, LLP.

(57) ABSTRACT

Routing table update messages that include both network-level and link-level addresses of nodes of a computer network are exchanged among the nodes of the computer network. Further, a routing table maintained by a first one of the nodes of the computer network may be updated in response to receiving one or more of the update messages. The routing table is preferably updated by selecting a next node to a destination node of the computer network only if every intermediate node in a path from the next node to the destination node satisfies a set of nodal conditions required by the first node for its path to the destination node and the next node offers the shortest distance to the destination node and to every intermediate node along the path from the next node to the destination node. The shortest distance to the destination node may be determined according to one or more link-state and/or node-state metrics regarding communication links and nodes along the path to the destination node. Also, the nodal characteristics of the nodes of the computer system may be exchanged between neighbor nodes, prior to updating the routing table. Preferred paths to one or more destination nodes may be computed according to these nodal characteristics, for example using a Dijkstra shortest-path algorithm.

7 Claims, 6 Drawing Sheets

Distance Table

| Neighbor | MAC addr for destination | IP addr for destination | Distance to destination | Predecessor M path to destination |
|---|---|---|---|---|
| • | • | • | • | • |
| • | • | • | • | • |
| • | • | • | • | • |

U.S. PATENT DOCUMENTS

| | | | |
|---|---|---|---|
| 4,987,536 | A | 1/1991 | Humblet |
| 5,088,032 | A | 2/1992 | Bosack |
| 5,115,433 | A | 5/1992 | Baran et al. |
| 5,233,604 | A | 8/1993 | Ahmadi et al. |
| 5,487,064 | A | 1/1996 | Galand et al. |
| 5,509,123 | A | 4/1996 | Dobbins et al. |
| 5,515,508 | A | 5/1996 | Pettus et al. |
| 5,528,593 | A * | 6/1996 | English et al. ............... 370/391 |
| 5,548,578 | A | 8/1996 | Matsune et al. |
| 5,557,748 | A | 9/1996 | Norris |
| 5,572,528 | A | 11/1996 | Shuen |
| 5,588,121 | A | 12/1996 | Reddin et al. |
| 5,596,719 | A | 1/1997 | Ramakrishnan et al. |
| 5,600,635 | A | 2/1997 | Hamaki et al. |
| 5,600,644 | A | 2/1997 | Chang et al. |
| 5,608,721 | A | 3/1997 | Natarajan et al. |
| 5,633,866 | A | 5/1997 | Callon |
| 5,638,371 | A | 6/1997 | Raychaudhuri et al. |
| 5,652,751 | A | 7/1997 | Sharony |
| 5,682,382 | A | 10/1997 | Shepard |
| 5,721,819 | A | 2/1998 | Galles et al. |
| 5,737,318 | A | 4/1998 | Melnik |
| 5,805,593 | A | 9/1998 | Busche |
| 5,845,086 | A | 12/1998 | Doebrich et al. |
| 5,854,899 | A | 12/1998 | Callon et al. |
| 5,881,246 | A | 3/1999 | Crawley et al. |
| 5,905,872 | A | 5/1999 | DeSimone et al. |
| 5,918,016 | A | 6/1999 | Brewer et al. |
| 5,922,063 | A | 7/1999 | Olnowich et al. |
| 5,926,463 | A | 7/1999 | Ahearn et al. |
| 5,933,425 | A | 8/1999 | Iwata |
| 5,938,736 | A | 8/1999 | Muller et al. |
| 5,940,596 | A | 8/1999 | Rajan et al. |
| 5,964,841 | A | 10/1999 | Rekhter |
| 5,991,299 | A | 11/1999 | Radogna et al. |
| 5,999,536 | A | 12/1999 | Kawafuji et al. |
| 6,006,272 | A | 12/1999 | Aravamudan et al. |
| 6,026,303 | A | 2/2000 | Minamisawa |
| 6,088,590 | A * | 7/2000 | Anderson et al. ........... 455/437 |
| 6,108,314 | A | 8/2000 | Jones et al. |
| 6,178,323 | B1 | 1/2001 | Nagata |
| 6,246,669 | B1 | 6/2001 | Chevalier et al. |
| 6,301,244 | B1 | 10/2001 | Huang et al. |
| 6,430,413 | B1 * | 8/2002 | Wedi et al. .................. 455/442 |
| 6,618,761 | B1 * | 9/2003 | Munger et al. .............. 709/241 |
| 6,690,929 | B1 * | 2/2004 | Yeh ............................. 455/406 |
| 6,754,169 | B1 * | 6/2004 | Baum et al. ................. 370/204 |

FOREIGN PATENT DOCUMENTS

| | | | |
|---|---|---|---|
| GB | | 2313254 A | 11/1997 |
| WO | WO 96/19887 | A | 6/1996 |
| WO | WO 97/09805 | A | 3/1997 |
| WO | WO 98/18280 | A2 | 4/1998 |

OTHER PUBLICATIONS

R.M. Metcalfe and D.R. Boggs, "ETHERNET: Distributed packet switching for local computer networks," Communications of the ACM, vol. 19, No. 7, pp. 395-403 (1976).

C. Wu and V.O.K. Li, "Receiver-initiated busy-tone multiple access in packet radio networks," ACM SIGCOMM '87 Workshop: Frontiers in Computer Communications Technology, Stowe, VT, USA, pp. 11-13 (Aug. 1987).

F.A. Tobagi and L. Kleinrock, "Packet switching in radio channels: Part III —polling and (dynamic) split-channel reservation multiple access," IEEE Trans. Commun., vol. COM-24, No. 8, pp. 832-845 (1976).

P. Karn, "MACA—a new channel access method for packet radio," in ARRL/CRRL Amateur Radio 9th Computer Networking Conference, pp. 134-140, ARRL (Apr. 1990).

C.L. Fullmer and J.J. Garcia-Luna-Acheves, "Solutions to Hidden Terminal Problems in Wireless Networks," Proceedings of ACM SIGCOMM '97, Cannes, France (Sep. 14-18, 1997).

C.L. Fullmer and J.J. Garcia-Luna-Acheves, "Floor Acquisition Multiple Access (FAMA) for Packet-Radio Networks," Proceedings of ACM SIGCOMM '95, Cambridge, MA (Aug. 28-Sep. 1, 1995).

K.C. Chen, "Medium-Access Control of Wireless LANs for Mobile Computing," IEEE Network, vol. 8, No. 5, pp. 50-63 (1994).

Timothy J. Shepard, "A Channel Access Scheme for Large Dense Packet Radio Networks," Proceedings of ACM SIGCOMM '96, Stanford University, pp. 1-12 (Aug. 1996).

I. Chlamtac, Andras Farago, and Hongbiao Zhang, "Time-Spread Multiple-Access (TSMA) Protocols for Multihop Mobile Radio Networks," IEEE/ACM Transactions on Networking, vol. 5, No. 6, pp. 804-812 (Dec. 1997).

Ji-Her Ju and Victor O.K. Li, "An Optimal Topology—Transparent Scheduling Method in Multihop Packet Radio Networks," IEEE/ACM Transactions on Networking, vol. 6, No. 3, pp. 298-306 (Jun. 1998).

Chenxi Zhu and M.S. Corson, "A Five-Phase Reservation Protocol (FPRP) for Mobile Ad Hoc Networks," Proceedings of IEEE INFOCOM '98 (Jul. 1998).

A. Ephremides and T. Truong, "Scheduling Broadcasts in Multihop Radio Networks," IEEE Transactions on Communications, vol. COM-38, No. 4 (Apr. 1990).

J. Haartsen, et al., "Bluetooth: Vision, Goals, and Architecture," Mobile Computing and Communications Review, XP-0007854002, US, ACM, New York, NY, vol. 2, No. 4, pp. 38-45 (Oct. 1, 1998).

L. Kleinrock and F.A. Tobagi, "Packet Switching in Radio Channels: Part 1 —Carrier Sense Multiple Access Modes and Their Throughput-Delay Characteristics," IEEE Trans. Comm., vol. COM-23, No. 12 pp. 1400-1416 (1975).

Barry M. Leiner, Donald L. Nielson, and Fouad A. Tobagi, "Issues in Packet Radio Network Design," Proceedings of the IEEE, vol. 75, No. 1, pp. 6-20 (Jan. 1987).

G. Markowsky and F.H. Moss. "An Evaluation of Local Path ID Swapping in Computer Networks," IEEE Trans. Commun., vol. COM-29, pp. 329-336 (Mar. 1981).

P. Newman, T. Lyon, and G. Minshall, "Flow Labeled IP: A Connectionless Approach to ATM," Proc. IEEE Infocom '96, San Francisco, CA, pp. 1251-1260 (Mar. 1996).

Yakov Rekhter, et al., "Tag Switching Architecture Overview," Proc. IEEE, vol. 85, No. 12 (Dec. 1997).

M. Schwartz and T. Stern, "Routing Techniques Used in Computer Communication Networks," IEEE Transactions on Communications, vol. COM-28, No. 4, pp. 539-552 (Apr. 1980).

A. Segall and J. Jaffe, "Route Setup with Local Identifiers," IEEE Trans. Commun., vol. COM-34, pp. 45-53 (Jan. 1986).

S. Murthy and .J. Garcia-Luna-Aceves, "An Efficient Routing Protocol for Wireless Networks," Proc. IEEE INFOCOMM '97, Kobe, Japan (Apr. 1997).

J.J. Garcia-Luna-Aceves, et al., "Wireless Internet Gateways (WINGS)," Annual Military Communications Conference, New York, New York, XP-000792611, IEEE pp. 1271-1276 (Nov. 3, 1997).

B. Rajagopalan, et al., "A Responsive Distributed Algorithm for Shortest-Path Routing Within Autonomous Systems," Internetworking: Research and Experience, XP-000669932 John Wiley & Sons, vol. 2, No. 1 pp. 51-69 (Mar. 1991).

V.O.K. Li and R. Chang, "Proposed Routing Algorithms for the US Army Mobile Subscriber Equipment (MSE) network," Proceedings IEEE MILCOM '86, Monterey, CA (Oct. 1986).

C. Perkins, "Ad Hoc on Demand Distance Vector (AODV) Routing," draft-ietf-manet.aodv-00.txt (Nov. 1997).

David B. Johnson and David A. Maltz, "Protocols for Adaptive Wireless and Mobile Networking," IEEE Pers. Commun., vol. 3, No. 1 (Feb. 1996).

V. Park and M. Corson, "A Highly Adaptive Distributed Routing Algorithm for Mobile Networking," IEEE INFOCOMM '97, Kobe, Japan (Apr. 1997).

Rohit Dube, et al., "Signal Stability-Based Adaptive Routing (SSA) for Ad Hoc Mobile Networks," IEEE Pers. Commun., vol. 4, No. 1, pp. 36-45 (Feb. 1997).

Zygmunt J. Haas and Marc R. Pearlman, "The Performance of Query Control Schemes for the Zone Routing Protocol," Proc. ACM SIGCOMM '98, Vancouver, British Columbia (Aug. 1998).

J. Broch, et al., "A Performance Comparison of Multi-Hop Wireless Ad Hoc Networking Routing Protocols," Proc. ACM MOBICOMM '98, Dallas, Texas (Oct. 1998).

J. Jubin and J. Tornow, "The DARPA Packet Radio Network Protocols," Proceedings of the IEEE, vol. 75, No. 1, pp. 21-32 (Jan. 1987).

C. Perkins and P. Bhagwat, "Highly Dynamic Destination-Sequenced Distance-Vector Routing (DSDV) for Mobile Computers," Proc. ACM SIGCOMM '94, London, UK (Oct. 1994).

S. Murthy and J.J. Garcia-Luna-Aceves, "An Efficient Routing Protocol for Wireless Networks," ACM Mobile Networks and Applications Journal, Special issue on Routing in Mobile Communication Networks (1996).

J.J. Garcia-Luna-Aceves, et al., "Wireless Internet Gateways (WINGS)," Proc. IEEE MILCOM '97, Monterey, California (Nov. 1997).

M. Pursley and H.B. Russell, "Routing in Frequency-Hop Packet Radio Networks with Partial-Band Jamming," IEEE Trans. Commun., vol. 41, No. 7, pp. 1117-1124 (1993).

R. Ramanathan and M. Steenstrup, "Heirarchically-organized, Multihop Mobile Wireless Networks for Quality-of-Service Support," ACM Mobile Networks and Applications, vol. 3, No. 1, pp. 101-119 (Jun. 1998).

C.V. Ramamoorthy and W. Tsai, "An Adaptive Hierarchical Routing Algorithm," Proceedings of IEEE COMPSAC '83, Chicago, Illinois, pp. 93-104 (Nov. 1993).

J.J. Garcia-Luna-Aceves and J. Behrens, "Distributed, scalable routing based on vectors of link states," IEEE Journal on Selected Areas in Communications, vol. 13, No. 8 (1995).

J.J. Garcia-Luna-Aceves and M. Spohn, "Scalable Link-State Internet Routing," Proc. IEEE International Conference on Network Protocols, (ICNP '98), Austin, Texas (Oct. 14-16, 1998).

P.A. Humblet, "Another Adaptive Shortest-Path Algorithm," IEEE Trans. On Commun., vol. 39, No. 6, pp. 995-1003 (Jun. 1991).

C. Cheng, R. Reley, S.P.R. Kumar, and J.J. Garcia-Luna-Aceves, "A Loop-Free Extended Bellman-Ford Routing Protocol without Bouncing Effect," Proc. ACM SIGCOMM '89, pp. 224-236 (Sep. 1989).

S. Murthy and J.J. Garcia-Luna-Aceves, "Loop-Free Internet Routing Using Hierarchical Routing Trees," Proc. IEEE INFOCOMM '97, Kobe, Japan (Apr. 7-11, 1997).

L. Kleinrock and F. Kamoun, "Hierarchical Routing for Large Networks: Performance Evaluation and Optimization," Computer Networks, vol. 1, pp. 155-174 (1977).

J. Behrens and J.J. Garcia-Luna-Aceves, "Hierarchical Routing Using Link Vectors," Proc. IEEE INFOCOMM '98, San Francisco, California (Mar. 29-Apr. 2, 1998).

Imrich Chlamtac and Andras Farago, "Making Transmission Schedules Immune to Topology Changes in Multi-Hop Packet Radio Networks," IEEE/ACM Transactions on Networking, vol. 2, No. 1, pp. 23-29 (Feb. 1994).

Durga P. Satapathy and Jon M. Peha, "Etiquette Modification for Unlicensed Spectrum: Approach and Impact," Proceedings of the IEEE Vehicular Technology Conference, vol. 1, pp. 272-276 (May 1998).

J.J. Garcia-Luna-Aceves and Chane L. Fullmer, "Performance of Floor Acquisition Multiple Access in Ad-Hoc Networks," pp. 1-6 (prior to Dec. 23, 1998).

Anthony Ephremides and Bruce Hajek, "Information Theory and Communication Networks: an Uncomsummated Union," IEEE Transactions on Information Theory, vol. 44, No. 6, pp. 1 & 3 (Oct. 1998).

C. David Young, "USAP: A Unifying Dynamic Distributed Multichannel TDMA Slot Assignment Protocol," Rockwell International Communication Systems Division, pp. 1-5 (Oct. 1996).

S. Ramanathan and Errol L. Lloyd, "Scheduling Algorithms for Multi-hop Radio Networks," ACM Transactions, pp. 211-222 (1992).

David A. Beyer, "Accomplishments of the DARPA SURAN Program," Information and Telecommunications Sciences and Technology Division, SRI International, pp. 0855-0862 (Jun. 1990).

David A. Beyer, et al., "Packet Radio Network Research, Development and Application," Information and Telecommunications Sciences and Technology Division, SRI International, pp. 1-35 (prior to Dec. 23, 1998).

J.J. Garcia-Luna-Aceves and David A. Beyer, "A Unified Routing Approach for Ad-Hoc Internetworking," Rooftoop Communications Corporation, pp. 1-16 (prior to Dec. 23, 1998).

J.J. Garcia-Luna-Aceves and David Beyer, Wireless Internet Gateways (WINGS), pp. 1-6 (prior to Dec. 23, 1998).

Jim Geier, "Overview of Common Routing Protocols," White Paper (Apr. 1998).

"Host Access Protocol Specification," RFC 907, Bolt Beranek and Newman Laboratories (Jul. 1984).

W. Edmond, "Host Access Protocol (HAP) Specification—Version 2," RFC 1221, Network Working Group (Apr. 1991).

Christian Huitema, "Routing in the Internet," Prentice Hall, pp. v-xii and 99-134 (1995).

Colin D. Frank and Michael B. Pursley, "Concatenated coding for frequency-hop spread-spectrum with partial-band interference," IEEE Transactions on Communications, vol. 44, No. 3, pp. 377-387 (Mar. 1996).

Volkan Rodoplu and Teresa H. Meng, "Minimum energy mobile wireless networks," in Proceedings of the 1998 IEEE International Conference on Communications, ICC '98, vol. 3, pp. 1633-1639, Atlanta, Georgia (Jun. 1998).

Richard Ogier and Nachum Shacham, "A Distributed Algorithm for Finding Shortest Pairs of Disjoint Paths," IEEE INFOCOMM '89, Eighth Annual Joint Conference of the IEEE Computer and Communications Societies, vol. 1, pp. 173-182 (Apr. 25-27, 1989).

Peter J.B. King and Nachum Shacham, "Delay Analysis of Multihop Packet Radio Networks," Performance '87, Proceedings of the 12th IFIP WG 7.3 International Symposium on Computer Performance Modelling, pp. 401-410, Brussels, Belgium (Dec. 7-9, 1987).

Nachum Shacham and Peter J.B. King, "The Performance of Multichannel Multihop Packet Radio Networks," ICC '96, pp. 873-877 (Jun. 22-25, 1986).

* cited by examiner

Routing Table

| Destination | IP Addr. | MAC Addr. | Dij | Sij | Path Traversal Tag | Dissemination Type Flag | Age |
|---|---|---|---|---|---|---|---|
| ... | ... | ... | ... | ... | ... | ... | |

FIG. 3

Distance Table

| Neighbor | MAC addr for destination | IP addr for destination | Distance to destination | Predecessor M path to destination |
|---|---|---|---|---|
| ... | ... | ... | ... | ... |

FIG. 4

Message Retransmission List

| Update Message being sent | Retransmission Counter | ACK-req'd Flag (neighbors) | | | | |
|---|---|---|---|---|---|---|
| | | 1 | 2 | 3 | ... | n |
| ⋮ | ⋮ | ⋮ | ⋮ | ⋮ | ⋮ | ⋮ |

FIG. 5

Routing Table Update Message

| Header | ID of Sending IR (e.g., IP addr.) | Sequence # | Update List (multiple entries) | Trailer |
|---|---|---|---|---| each entry

| Update/ ACK | destination addr./ sequence # | predecessor/ source | dissemination type flag/ not used |
|---|---|---|---|

FIG. 6

Search Query

| MAC addr. of sending IR | IP addr. of sending IR | sequence # | forward path information |
|---|---|---|---|

FIG. 7

Search Query Response

| MAC addr. of sending IR | IP addr. of sending IR | sequence # of query | path information from querying IR to destination |
|---|---|---|---|

Query Sent Table

| IP addr. of destination | Query-Type Flag | Counter |
|---|---|---|
| | | |

FIG. 10

UNIFIED ROUTING SCHEME FOR AD-HOC INTERNETWORKING

CROSS-REFERENCE TO RELATED APPLICATION

The present application is a divisional of and claims priority to U.S. patent application Ser. No. 09/221,228 filed Dec. 23, 1998, (now abandoned by operation of law) which is hereby incorporated by reference in its entirety.

STATEMENT OF GOVERNMENT LICENSE RIGHTS

The United States Government has a paid-up license in portions of this invention and the right in limited circumstances to require the patent owner to license others on reasonable terms as provided for by the terms of Contract No.: DAAH01-97-C-R124, awarded by the U.S. Army Missile Command.

FIELD OF THE INVENTION

The present invention relates to routing protocols in computer networks and, more particularly, routing protocols for ad-hoc networks, in which both routers and hosts can move and in which routers can have both hosts and networks attached to them.

BACKGROUND

Packet-radio technology has the potential of becoming a major component of the global information infrastructure, at least in part because it requires no wiring and need not require third-party service providers or the configuration of forwarding tables. However, the routing approaches that have been proposed or implemented to date for the Internet or ad-hoc networks (i.e., those networks which do not have a preconceived topology) do not allow for non-technical users to install and operate such networks (or any multi-hop packet-radio networks) as seamless extensions of the Internet.

In traditional Internet routing approaches, bridges or routers are used to forward data packets using media access control (MAC)- or network-level addresses, respectively. Performing routing at the link level using transparent bridges has the advantage that limited configuration is required for the bridges and hosts used in the internetwork; furthermore, the frames forwarded by bridges can encapsulate any type of network-level protocol (e.g., Internet protocol (IP) and Internet packet exchange (IPX)). The disadvantage of using transparent bridges for network interconnection is that both data and control packets (frames) are sent over a spanning tree to avoid looping of packets, which means that data packets are sent over paths longer than the shortest paths and the available bandwidth is underutilized. Furthermore, in an ad-hoc network, maintaining a spanning tree may incur excessive overhead depending on mobility. On the other hand, performing routing at the network level facilitates aggregation of routing updates, and permits data packets to be sent over the shortest paths using the available links efficiently. The disadvantages of this approach are that routers have to be configured with appropriate addressing information before they can start forwarding packets, network-level addresses have to be carefully allocated, and the router must understand which network-level protocol is being routed (e.g., IP or IPX).

All routing protocols proposed and implemented to date for either ad-hoc networks or the Internet fall into two major categories: table-driven and on-demand routing protocols. In a table-driven routing protocol, a router maintains a routing-table entry for each destination in the network and runs a routing-table update algorithm to maintain up-to-date entries. Table-driven routing protocols have been proposed based on topology broadcast or the dissemination of vectors of distances. In an on-demand routing protocol, a router maintains routing-table entries for only those destinations with which it needs to communicate. A typical on-demand routing protocol requires a router to use a flood search method to determine the shortest paths to destinations for which it does not currently have a routing-table entry.

Each type of protocol has its advantages and disadvantages. For example, a table-driven routing protocol supports datagram traffic very efficiently and can detect network partitions very quickly; however, each router must exchange routing information for all the destinations in the network or internetwork, which may be taxing on the battery life of tetherless wireless routers. By contrast, an on-demand routing protocol does not require routers to send updates regarding those destinations with which they do not communicate; however, routers need to search for an unknown destination before they are able to forward data to it. Consequently, on-demand routing approaches are typically not well suited for datagram traffic. On-demand routing also incurs much more control traffic than table-driven routing protocols when the network or internetwork becomes partitioned or routers fail, due to the resulting repeated generation of flood search packets, which only discover that the destinations are unreachable.

Routing in ad-hoc networks is typically accomplished by treating the entire ad-hoc network as an opaque sub-network using a routing protocol within the sub-network to forward data packets from one end of the sub-network to the other. In such methods, the ad-hoc network simply looks like a link (or set of links) to the IP layer. Although this approach is appealing at first glance, it does not avoid any of the address assignment, router configuration, and management issues associated with Internet routing. Thus, what is needed is a new approach for routing within ad-hoc networks.

SUMMARY OF THE INVENTION

In one embodiment, routing table update messages that include both network-level addresses and other (e.g., link-level, possibly MAC-level) addresses of nodes of a computer network are exchanged among the nodes of the computer network. The update messages may be exchanged in response to an indication that a new node has been added to the computer network or that one of the nodes has been dropped from the computer network (e.g., that communication with the node has been lost). Further, a routing table maintained by a first one of the nodes of the computer network may be updated in response to receiving one or more of the update messages.

The routing table is preferably updated by selecting a next node to a destination node of the computer network only if every intermediate node in a path from the next node to the destination node satisfies a set of nodal conditions required by the first node for its path to the destination node and the next node offers the shortest distance to the destination node and to every intermediate node along the path from the next node to the destination node. The shortest distance to the destination node may be determined according to one or more link-state and/or node-state metrics regarding communication links and nodes along the path to the destination node. Also, the nodal characteristics of the nodes of the computer system may be exchanged between neighbor nodes, prior to updating the routing table. Preferred paths to one or more destination nodes may be computed according to these nodal characteristics, for example using a Dijkstra shortest-path algorithm.

In some cases, the exchange of routing table update messages may involve exchanging node distance and node predecessor information among the nodes of the computer network. Such information may be included in the update messages and individual entries in each update message may be processed in order at a receiving node of the computer network. Transmitting nodes of the computer network preferably order the individual entries in the update messages according to distances to destination nodes. Further, for each entry of one of the update messages, one of the receiving nodes may determine whether an implicit path to one of the destination nodes defined by the node distance and node predecessor information is free of loops. In yet further cases, a routing table entry for a destination node that was established according to path information provided by a first neighbor node, at a first of the nodes of the computer network may be updated according to information included within at least one of the update messages received from a second neighbor node.

In a further embodiment, routing tables for a computer network may be updated by disseminating routing table update information regarding nodes of the computer network that are well known throughout the network. In such cases, the update information includes both network-level and link-level addresses for the well-known nodes. Moreover, further updating may be accomplished by transmitting routing table update information regarding nodes that are not well known throughout the computer network in response to search queries regarding such nodes. In some cases, the search queries are flooded throughout the computer network on a best-effort basis. New search queries may be treated as network-level queries and retransmitted search queries treated as host-level search queries.

Upon receipt of one of the search queries, a first node of the computer network may search a query cache to determine whether it has already processed that search query. In addition, the first node may determine whether that search query is a host-level search query or not.

If the first node determines that the search query is a host-level query, the first node may respond to the search query if it has not already done so and if it is able to provide path information to a destination specified in the search query. Alternatively, if the first node has not already responded to the search query but does not have the path information to the destination, the first node may transmit a local request for the path information to local hosts associated with the first node. In those cases where the first node receives a local response to the local request, the first node transmits the path information from the local response in response to the search query. Otherwise, the first node transmits the search query to neighbor nodes of the computer network if there are any. On the other hand, if the first node determines that the search query is not a host-level query, the first node either transmits a response to the search query if the first node has path information to a destination specified in the search query or forwards the search query to neighbor nodes of the computer network, if any.

The routing table update information regarding nodes that are not well known throughout the computer network may be provided as search query response messages by one or more nodes of the computer network having path information relating to the nodes that are the subject of the search queries. In such cases, one of the nodes having the path information adds a path entry for itself to the path information before providing an associated search query response message. The path entry includes a network-level and a link-level address of the node having the path information and may further include a network-level and a link-level address of a node from which the node having the path information received the search query.

Preferably, at least one of the nodes of the computer network maintains a table of the search queries it has transmitted. Such a table of search queries may include an indication of whether a particular search query is a network-level search query or a host-level search query. Note, however, that network-level search queries may be retransmitted as host-level search queries within the computer network if no responses are received to network-level searches.

In yet another embodiment, a routing table in a computer network may be updated by specifying a path from an origin of a search query to a destination in the computer network that is the subject of the search query, the path including both network-level and link-level addresses of the destination. The path is relayed between nodes of the computer network, from a first node that produces the path to the origin of the search query. However, any one node of the computer network relays the path only if it is included in the path between the origin of the search request and the destination. Relaying nodes of the computer network that receive the path, may update respective routing tables to include the path but only retain the path in their routing tables if the path is associated with a node that is well known throughout the computer network. Otherwise, the path is removed from their respective routing tables after a specified period of time.

Still another embodiment provides routing table having a network-level address of a destination node of a computer network and a link-level address of the destination node. The network-level address and link-level address are preferably included in a single entry of the routing table regarding the destination node. The network-level address is preferably an Internet protocol (IP) address, while the link-level address is preferably a medium access control (MAC) address.

The single entry in the routing table may further include path information (e.g., distance and/or predecessor information) regarding the destination node. Such distance information may be based on link-state information and/or node-state information of a path within the computer network. In some cases, the path is a shortest path between the destination and a node that maintains the routing table. The predecessor information refers to a node of the computer network that is the second-to-last hop from the node that maintains the routing table to the destination along the path.

Generally, the routing table is maintained by a router, which may also have a distance table that is configured to store routing tree information received by the router from neighbor nodes of the computer network. The router may further have a message retransmission list that is configured to include information regarding routing table update messages transmitted by the router to the neighbor nodes.

Still additional embodiments provide various cost metrics for a computer network. Among these are measures of interference over time to neighbor nodes of a first node of the computer network per data bit transmitted on a communication link used by the first node. Such a metric may be estimated using the RF transmit power used by the first node for the communication link, the link data rate and the RF-path loss on the communication link, which is determined by a neighbor node comparison of the RF transmit power to a received signal strength at the neighbor node.

Another cost metric may be a measure of node energy consumed per data bit for transmissions over a communication link within the computer network. Here, node energy is computed so as to account for all power not used by a node in a non-transmitting state.

A further cost metric may be a measure of the quality of a wireless communication link within the computer network. Such a metric may find use in determining which links of the network to utilize. For example, one may examine local routing information maintained by a first node of a computer network to determine whether alternate paths exist to a neighbor node of the first node, using a sequence of one or more links other than a candidate link through the computer network and compute a link quality of the candidate link. Then, if no alternate path exists to the neighbor node, or the link quality of the candidate link exceeds a defined threshold value, the candidate link may be accepted. If one or more alternate paths do exist to the neighbor node, then by comparing link qualities of the links along each of the alternate paths with the link quality of the candidate link one may decide to accept the candidate link if the link quality of the candidate link compares favorably with the link qualities of the links on the alternate paths.

Such a favorable comparison may be one wherein the link quality of the candidate link is equal to or better than a link quality of a worst one the link qualities of the links on the alternate paths, or one wherein the link quality of the candidate link is equal to or better than a path quality function of the links along the alternate paths. For example, if the link quality of any link in the computer network is equal to the probability of success for each packet transmitted over the link, then the path quality function of the links along the alternate paths comprises the products of the link qualities for each of the links on the alternative paths.

Metrics for individual nodes of a computer network may also be used. For example, metrics which are an indication of the type of power available to the node, the power state of the node, or an indication of whether the node is an anchor for the computer network.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Presented below is an Ad-hoc Internet Routing (AIR) protocol that provides a unified scheme for ad-hoc internetworking. Because supporting traffic to and from the Internet is likely to be a key requirement of ad-hoc networks, the hosts and networks attached to the packet radios with which the ad-hoc network is built (which will be referred to as Internet Radios or IRs) need Internet addresses. These Internet addresses are needed even if the IRs support routing at the sub-network level or link level within the ad-hoc network. Assigning Internet addresses to IRs also provides benefits from the standpoint of network management, because it enables the use of standard and emerging network management products based on the simple network management protocol (SNMP).

AIR enables ad-hoc internets by supporting routing at the IP layer rather than below it. Thus, AIR advances the state of the art in routing in ad-hoc networks in a number of ways. For example, AIR uses both medium-access control (MAC) addresses and Internet addresses while providing shortest paths to known destinations. For some embodiments, the shortest (or preferred) path calculations may be made on the basis of link-cost metrics and/or node-cost metrics. Further, AIR permits an IR to act as the proxy destination node for all the hosts attached to the IR, or to act as an intermediary between senders and receivers of Address Resolution Protocol (ARP) requests. These address-mapping services allow the hosts attached to the IRs to perceive the ad-hoc internet as a single broadcast LAN. Also, AIR updates routing-table entries using both source- and destination-based routing-table update mechanisms.

AIR is discussed in greater detail below, with reference to certain illustrated embodiments. However, upon review of this specification, those of ordinary skill in the art will recognize that AIR may find application in a variety of systems. Therefore, in the following description the illustrated embodiments should be regarded as exemplary only and should not be deemed to be limiting in scope.

I. Overview of AIR Protocol

Figure 1:
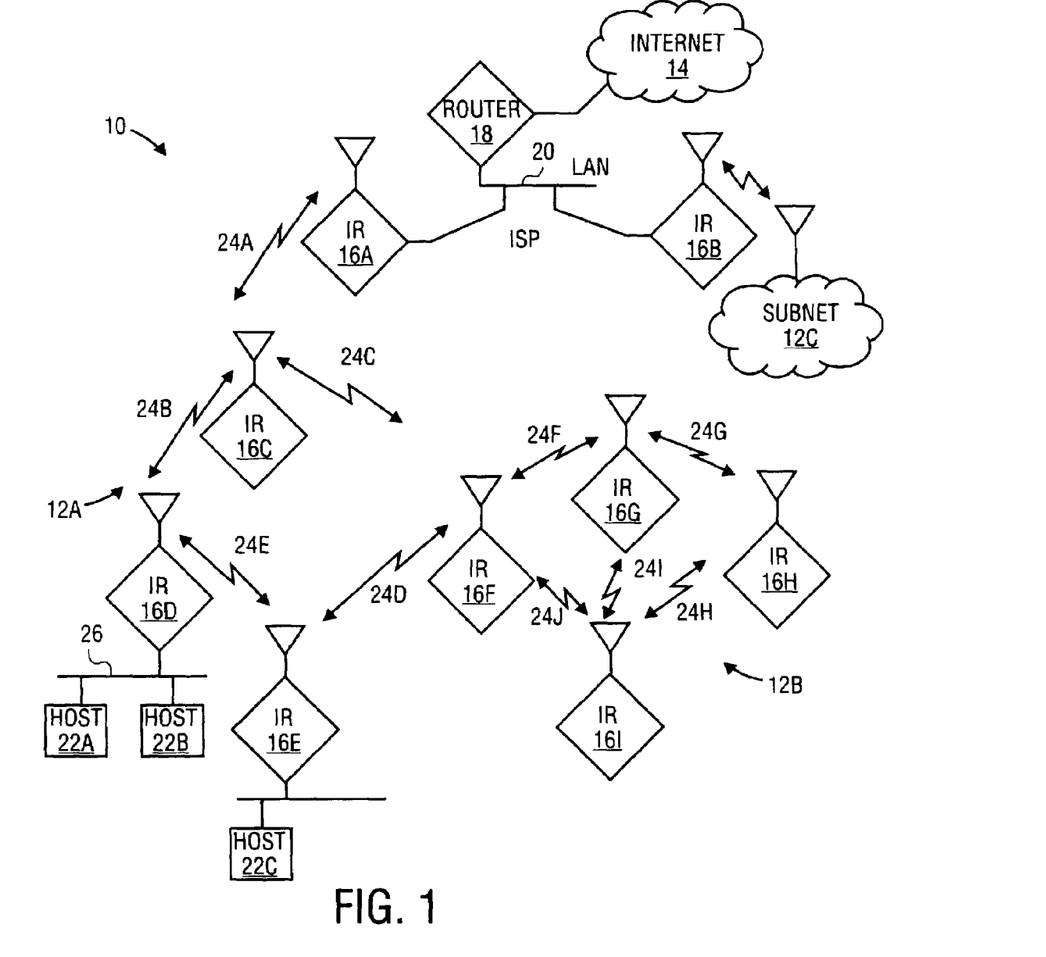
FIG. 1 illustrates an ad-hoc network that includes a number of sub-networks and an interconnection to the Internet through a router maintained by an Internet service Provider (ISP)

AIR is well suited for an ad-hoc internet that provides a seamless extension of the IP Internet to the ad-hoc wireless environment. In contrast to the IP Internet, mobility of hosts and routers, and changes to link- and/or node-costs are the rule, rather than the exception, in an ad-hoc internet. FIG. 1 illustrates aspects of an exemplary ad-hoc network that will assist in understanding the remaining discussion.

Ad-hoc network 10 may be considered as a number of sub-networks 12a, 12b, 12c, which provide an extension of the Internet 14 through a number of IRs 16a–16i. Each IR 16a–16i may be a packet radio with an assigned IP address. In general, the IRs 16a–16i operate over a single channel using spread spectrum wireless communication techniques common in the art. For example, the IRs 16a–16i may operate in one of the unregulated UHF frequency bands, thereby obviating the need for operating licenses. At each IRs 16a–16i, AIR may run on top of a User Datagram Protocol (UDP), similar to the Routing Information Protocol (RIP). As the figure illustrates, an IR is essentially a wireless IP router; with the exceptions that: AIR substitutes for traditional internet routing protocols like RIP or the open shortest path first (OSPF) protocol, the AIR routing protocol interacts through shared tables with the link-layer protocols in order to reduce control traffic needed to maintain routing tables, and the AIR channel access protocols are designed for the broadcast radio links 24a–24j of ad-hoc network 10.

Coupling of ad-hoc network 10 to the Internet 14 is achieved through a router 18, which may be operated by an Internet Service Provider (ISP). As shown, a single ISP may operate a LAN 20 to which multiple IRs are connected. In such a scheme, IRs 16a and 16b may act as "AirHeads", providing gateway service to Internet 14 via router 18. Some IRs, e.g., IRs 16d and 16e of FIG. 1, may be associated with hosts, 22a, 22b and 22c, that can be accessed by any Internet user through ad-hoc network 10.

AIR is based on a routing-table updating approach as introduced in the Wireless Internet Routing Protocol (WIRP) described by J. J. Garcia-Luna-Aceves et al., "Wireless Internet gateways," Proc. IEEE MILCOM 97, Monterey, Calif., Nov. 2–5, 1997, pp. 1271–76; and S. Murthy and J. J. Garcia-Luna-Aceves, "An Efficient Routing Protocol for Wireless Networks," Proc. IEEE INFOCOM 97, Kobe, Japan, April 1997. However, AIR extends WIRP in a number of ways. First, AIR allows IRs to use both MAC-level (i.e., link level) and Internet (i.e., IP) addresses in the routing tables. Second, AIR uses both table-driven and on-demand mechanisms to update routing-table entries. Third, AIR supports proxy ARP services to the hosts attached to IRs. Fourth, AIR uses both link metrics and node characteristics to compute paths to destinations.

Another difference between AIR and WIRP is that AIR uses the services provided by a dedicated neighbor management protocol, which maintains the status of an IR's connectivity with its neighbors. In contrast, WIRP implements its own mechanisms to ascertain the connectivity of an IR with its neighbors.

Figure 2A:
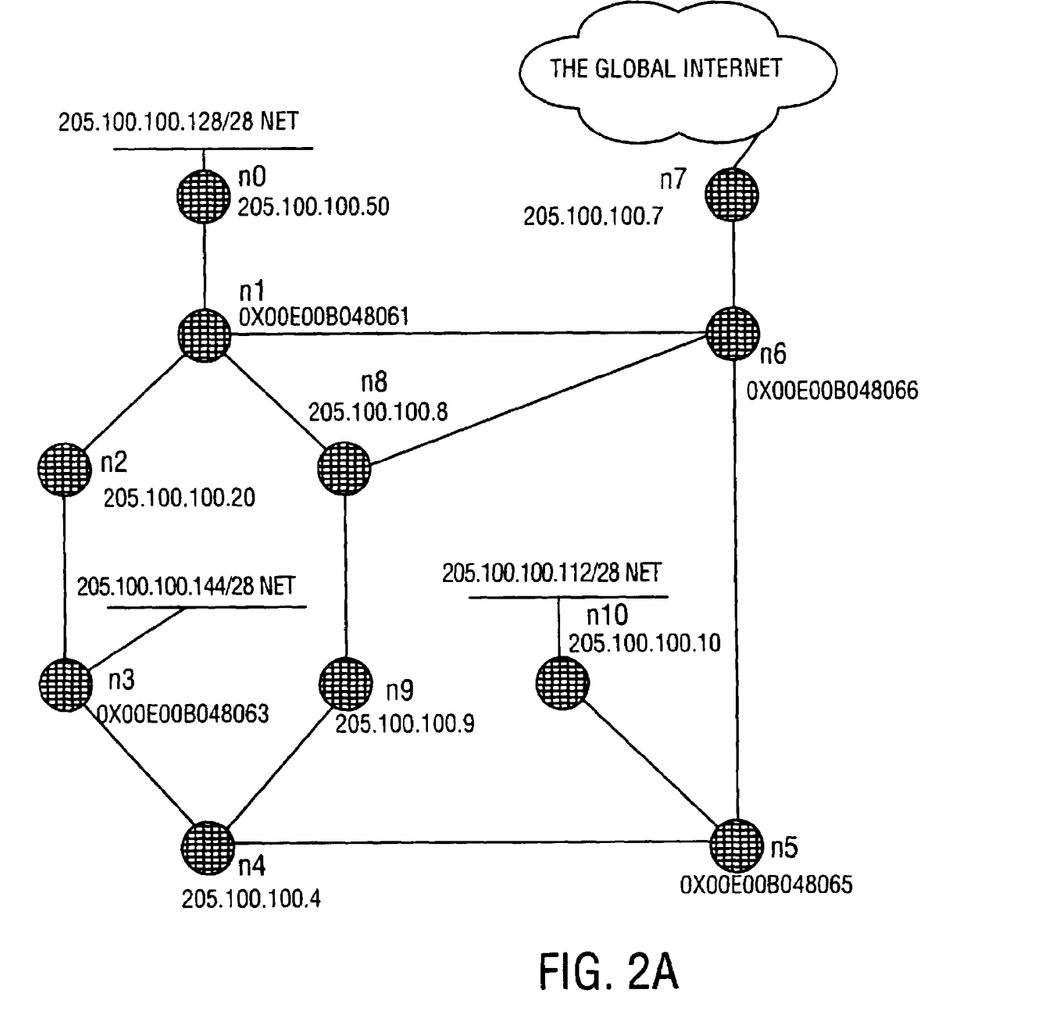
FIG. 2A illustrates another example of an ad-hoc network topology, including node IP-level and MAC-level addresses.
Figure 2B:
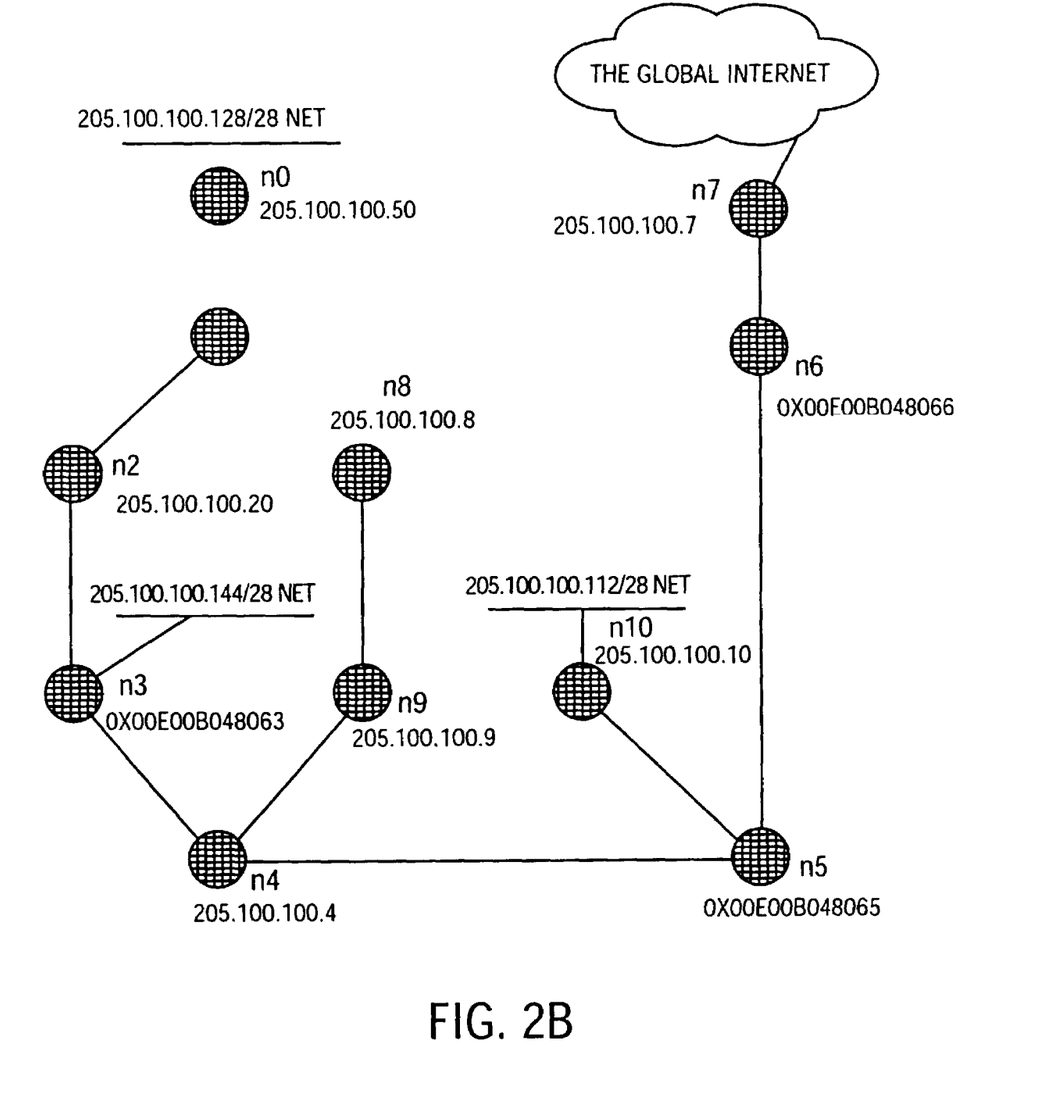
FIG. 2B illustrates a routing tree communicated by one of the nodes of the ad-hoc network illustrated in FIG. 2A in accordance with one embodiment of the present invention.

Each IR communicates a hierarchical routing tree to its neighbors in an incremental fashion. The hierarchical routing tree reported by an IR consists of all the preferred paths by the IR to each network, IR, and host with which the IR needs to communicate or to which it needs to forward traffic according to requests received from neighbor IRs. An entire remote IP network is simply a node in the routing tree. FIG. 2A shows a simple network topology and FIG. 2B shows the routing tree that IR (or node) n3 notifies incrementally to its neighbors.

The way in which an IR disseminates routing information about a given destination is determined by the value of a dissemination-type flag in the routing table. Changes to routing-table entries corresponding to IP networks or nodes where servers are located are typically disseminated throughout the ad-hoc internet, while changes to routing-table entries corresponding to individual IRs and hosts are disseminated on demand. FIG. 2B illustrates this point. Note that the routing tree notified by node n3 does not include node n0, because n0 is not a node that must be known throughout the ad-hoc internet and node n3 does not need to communicate with or forward data through n0. It is also important to note that the addresses used to identify nodes in the ad-hoc internet are both IP addresses and MAC-level addresses.

IRs exchange their hierarchical routing trees incrementally by communicating only the distance and second-to-last hop (predecessor) to each destination. In the case of destinations within or directly attached to an IR's own IP network, the second-to-last hop consists of an IR (i.e., a host-level IP Address). In the case of a remote IP network known to the IR and not directly attached to the IR's own IP network, the predecessor consists of another IP network. Hence, internet routing in AIR does not require an IR to store more routing-table entries than an Internet routing protocol like RIPv2 would, for example. An IR communicates updates to its routing tree by means of routing-table updates sent as a result of connectivity changes, periodically, or in response to on-demand search queries. AIR permits IRs to search for paths to known IP addresses obtained through a name server, or to search for the actual location of an IP host that moves from one IR to another and remains quiet. Connectivity changes are communicated to AIR by the neighbor protocol implemented in the IR.

Routing information is exchanged among neighboring IRs by means of update messages, search queries, and replies to such queries. Update messages are used to update routing-table entries that must be known by all IRs in the ad-hoc internet. Search queries are used to update routing-table entries on a demand basis.

From the standpoint of host-level involvement, it is not efficient to require that all hosts in a large ad-hoc internet receive an ARP request whenever any given host sends such a request. Although IRs permit hosts to operate as if they were attached to a common LAN, IRs have much more routing information than do traditional transparent bridges. In particular, they know about both MAC and IP-level addresses of destinations. Accordingly, as long as IRs know which hosts are currently attached to them, they need not ask hosts to answer ARP requests, because the IRs attached to the destination hosts can answer for them. In some cases hosts that are already configured may relocate and remain silent after moving from one IR to another. In such cases, there may be no IR that can provide the correct mapping of IP to MAC address and the ARP request may have to be answered by the hosts themselves.

Two classes of search queries may be defined in AIR: IR-level searches and host-level searches. In an IR-level search, an IR receiving the query processes the query without forwarding any request to its attached hosts, if it has any. In a host-level search, an IR receiving the query processes the query as in the case of an IR-level search and also sends an ARP request to its attached hosts. IR-level searches are likely to suffice most of the time, because IRs know their attached hosts as soon as the hosts send ARP requests to the associated IRs. Accordingly, IRs may attempt IR-level searches before attempting host-level searches.

AIR can be functionally divided into three main components: the proxy and indirect ARP mechanisms, the routing-table update algorithm, and the reliable exchange of updates. Each of these functional components is addressed in the following sections.

II. Information Maintained in AIR

Figure 3:
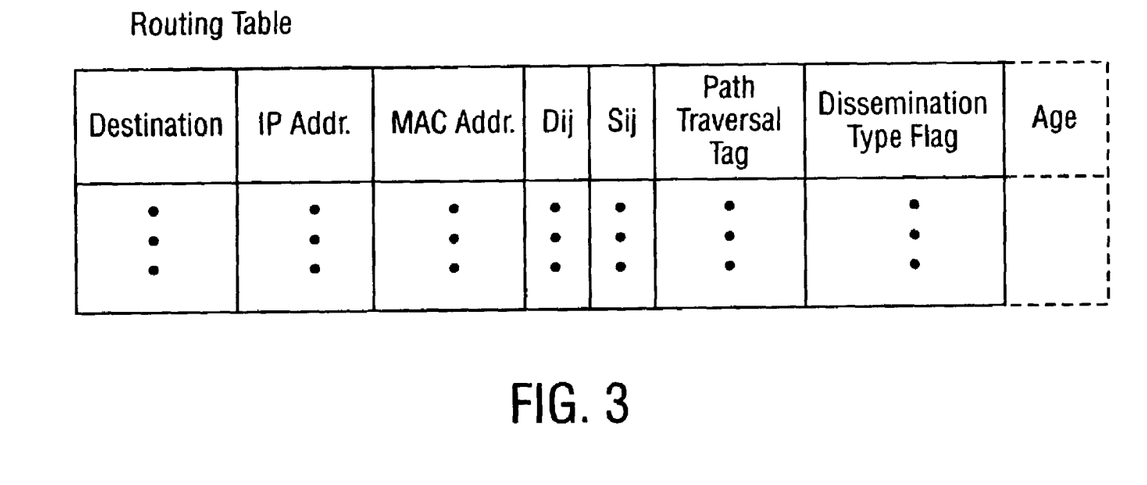
FIG. 3 illustrates an example of a routing table that may be maintained by an Internet Radio (IR) according to one embodiment of the present invention.

For the purposes of routing, each IR maintains a routing table, a distance table, and a message retransmission list. As shown in FIG. 3, the entry for a destination j in IR i's routing table includes the destination's IP address, its MAC address, or both, the distance to the destination ($D_{ij}$), the successor (Sij), and the predecessor (Pij) along the preferred path (e.g., the shortest path) to the destination. The predecessor to a destination is the second-to-last hop along the preferred path.

The routing table also maintains two markers used to update the routing-table entries, a path traversal tag and a dissemination-type flag. The path-traversal tag for a destinations specifies whether the entry corresponds to a simple path (tag=correct), a loop (tag=error) or a destination that has not been marked (tag=null). This tag is used to reduce the number of routing table entries that need to be processed after each input event impacting the routing table. Also for destination j, the dissemination-type flag determines how the IR maintains the entry and how it disseminates updates to the entry. If the value of the flag is set (e.g., to one), the destination is well known in the ad-hoc internet. In such cases, the IR recognizes that it must keep an entry for the destination at all times, and that it must report changes to the distance or predecessor to the destination. If the value of the dissemination-type flag is not set (i.e., is zero), the IR does not report changes to the distance or predecessor information for that destination in update messages to its neighbors; rather, the IR keeps the entry for a finite amount of time given by an age field that is managed locally.

The routing table of a given IR contains an entry for a subset of all the destinations in the ad-hoc internet. The IR maintains routing-table entries for only those destinations with which it has to communicate or to which it has to relay information.

Figure 4:
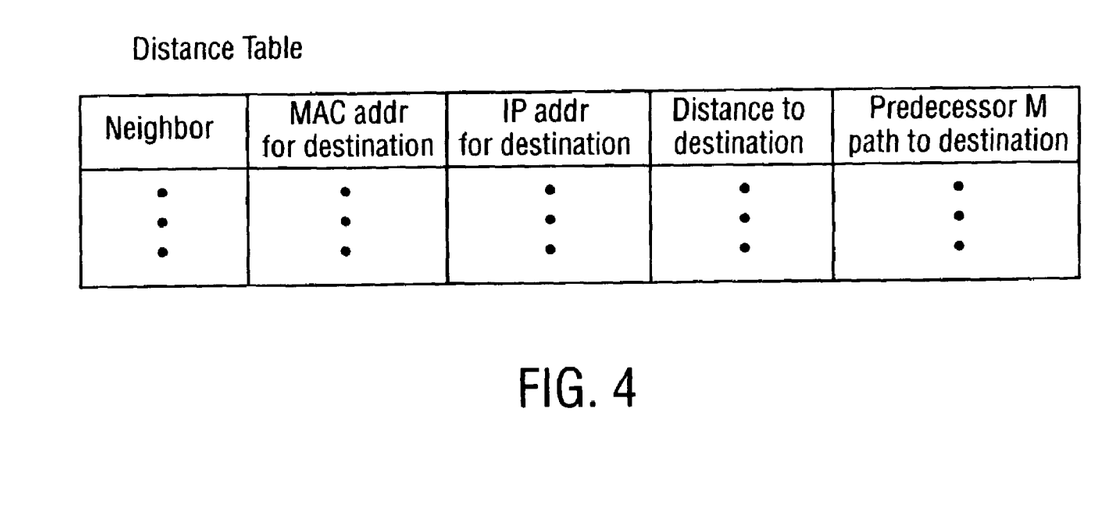
FIG. 4 illustrates an example of a distance table that may be maintained by an IR according to one embodiment of the present invention.

As illustrated in FIG. 4, the distance table of an IR maintains the routing-tree information reported by each of its neighbor IRs. Each entry reported by a neighbor IR in an update message or a search query consists of a set of addresses for the destination (typically a MAC address, an IP address, or both), the distance to the destination, and the predecessor in the path to the destination. More generally, the set of addresses may include a network-level address and another address, for example a link-level address (e.g., addresses defined by the IEEE 802 family of standards for computer networks) or a sub-network address, where appropriate.

An underlying neighbor protocol may be used to update the routing table indicating changes in connectivity with neighbors. When the neighbor protocol detects a new neighbor or loss of connectivity with a neighbor, it updates an entry for the IR or host in the routing table and notifies AIR of the need to update the distance table and predecessor information in the routing table. The neighbor protocol may also provide an IR with information about the cost of a link with a neighbor IR in both directions.

Figure 5:
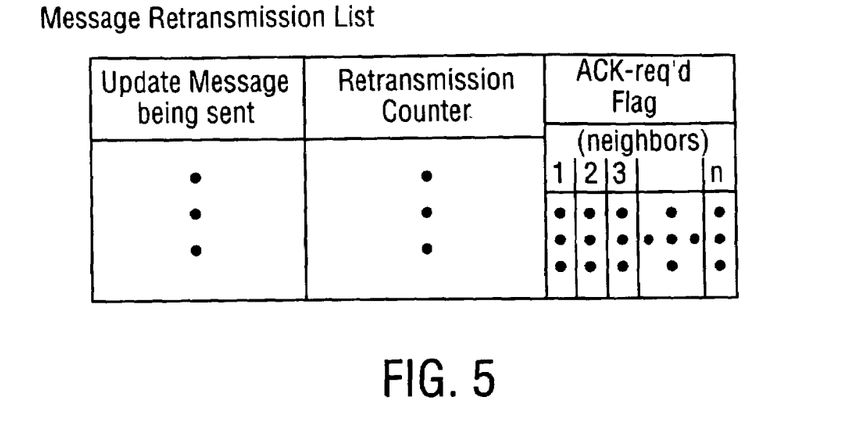
FIG. 5 illustrates an example of a message retransmission list that may be maintained by an IR according to one embodiment of the present invention.

As illustrated in FIG. 5, a Message Retransmission List (MRL) may be used to specify one or more retransmission entries. For example, a given MRL entry may specify: the update message that is being sent to neighbor IRs, a retransmission counter that is decremented every time the IR retransmits the same update message (in one embodiment, each update message may be sent a maximum number of times, for example four times), and an ACK-required flag for each neighbor IR specifying whether or not the neighbor has acknowledged the update message. An IR uses the MRL to ensure that updates are sent reliably to its neighbors.

III. Information Exchanged in AIR

Figure 6:
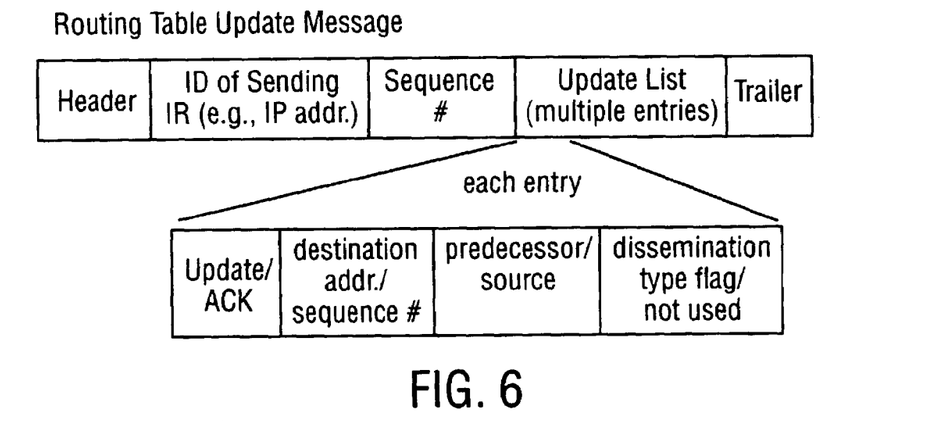
FIG. 6 illustrates an example of a routing-table update message according to one embodiment of the present invention.

A routing-table update message generally includes the identifier of the sending IR (typically its IP address), a sequence number assigned by the sending IR, and an update list of one or more entries. The update message may be formatted as a packet as shown in FIG. 6. Appropriate header and/or trailer information may be included for addressing and/or error correction purposes, etc.

An update entry specifies whether the entry is an update to the routing table of the sending IR or an acknowledgment (ACK) to an update message. An update entry preferably specifies at least one address for a destination, a predecessor for the destination, and a dissemination-type flag that indicates the way in which the receiving IR should notify its own neighbors about changes in its distance or predecessor to that destination. An ACK entry should specify the sequence number and the source of the update message being acknowledged. The dissemination flag of an update entry is usually set, because an IR need only send update messages to its neighbor IRs concerning those destinations that must be widely known in the ad-hoc network.

Figure 7:
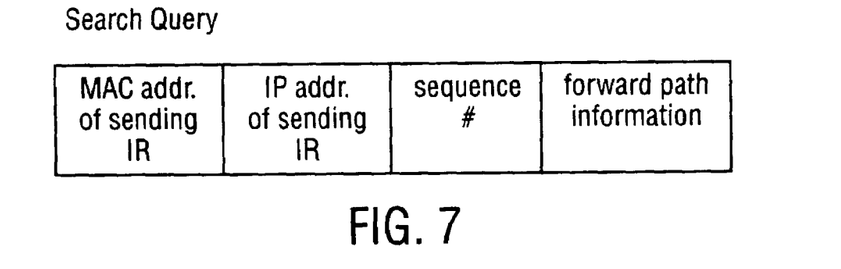
FIG. 7 illustrates an example of a search query according to one embodiment of the present invention.

As shown in FIG. 7, a search query generally specifies the MAC and IP address of the sending IR, a sequence number, and the forward path traversed by the query from its originating IR to the IR forwarding the query. This forward path may be specified using entries that are the same as the update entries in update messages. The dissemination-type flag of a forward-path entry may or may not be set, depending on whether the intermediate hop corresponds to an IR or network that must be known by other IRs or not.

Figure 8:
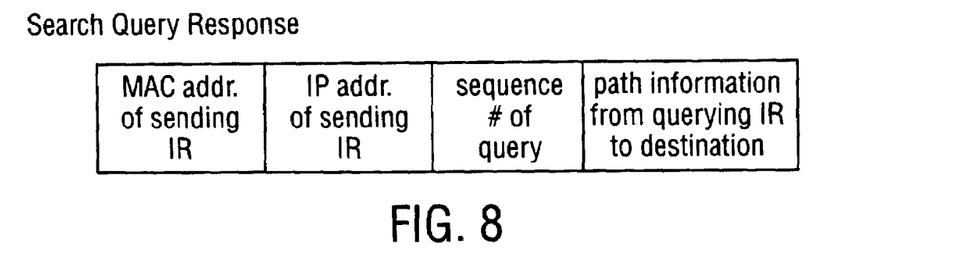
FIG. 8 illustrates an example of a search query response according to one embodiment of the present invention.

As illustrated in FIG. 8, a response to a search query may specify the MAC and IP address of the sending IR, the sequence number of the query being answered, and the complete path from the IR that originated the query to the destination. Note that the IR responding to a query has to notify a complete path to a destination only if it includes intermediate hops that are not known throughout the ad-hoc internet. However, in one embodiment of AIR, complete paths are used in order to simplify the protocol. Each hop in the path specified in a response to a search query is specified in terms of: the address(es) of the intermediate hop(s), the predecessor and distance to the hop(s), and the dissemination-type flag for the hop(s) (which may be set or not). The distance and predecessor information for each hop specified in the response may be obtained directly from the responding IR's routing table.

Because update messages are used to update routing information for well-known destinations, update entries always correspond to destinations that are known throughout the ad-hoc internet. In contrast, the entries of a reply to a search query may correspond to either well-known destinations or destinations that IRs receiving the reply need not mention to their neighbor IRs, except the neighbor that requested the information. In one embodiment of AIR dissemination-type flags are included in update entries. Further, an IR may order the routing information it sends in update messages, search queries, or replies to such queries based on its distance to the destination.

IV. Proxy ARP and Indirect ARP Mechanisms

Returning now to FIG. 1, it should be noted that AIR allows hosts, e.g., 22a, 22b and 22c, in the ad-hoc network 10 to operate as if they were all attached to a common local-area network (LAN). For example, hosts 22a and 22b attached to IR 16d through a LAN or a serial (or other) interface 26, view IR 16d as the destination, unless the destination is attached to the same LAN 26 or the hosts 22a and 22b are configured with the MAC address of destinations (i.e., as if they were physically attached to LAN 26). IR 16d is then capable of determining the correct paths to the true destinations (specified in terms of IP or MAC addresses) by means of the routing-table update mechanisms described below.

For a host to communicate with another host using end-to-end protocols running on top of the Internet Protocol (IP), the source host must first obtain the Internet address (IP address) of the destination host. This is accomplished by means of a directory service (e.g., the Domain Name System or DNS), which maps domain names to IP addresses. If the source and destination hosts share a common LAN, the source host needs also to find the MAC address of the destination host. The MAC addresses serve as the name of the hosts inside a LAN and permit the network interfaces with which hosts attach to the LAN to provide a host with only those packets addressed to it. For example, in Ethernet LANs the mapping of a destination's IP address to its MAC address is supported by the ARP.

Because an ad-hoc internet typically has multiple hops, when an attached source host (e.g., host 22a in FIG. 1) sends an ARP request for a destination host (e.g., host 22c) that is not directly attached to a common IR, the IR (e.g., 16d) connected to the source host acts like a destination and answers the ARP request. That is, it provides a proxy ARP service to all the hosts attached to it through a LAN or serial (or other) interface (e.g., LAN 26). The IR (e.g., 16d) then finds the shortest (e.g., as measured by an appropriate metric or set of metrics) path to the destination host (e.g., 22c) in collaboration with other IRs (e.g., IR 16e in this example) using the routing-table updating mechanisms, which are completely transparent to its attached hosts. Accordingly, an IR serves as the default router for all the hosts that attach to it through a common LAN or serial interface.

The mechanisms used by an IR to learn the MAC address of a destination are described within the context of routing-table updating. The IR responds to an ARP request from a host as soon as it obtains the next hop to the intended destination. The steps taken by an IR to obtain a path to a destination are transparent to the host sending an ARP request, because the allowed delays in getting an ARP response are typically longer than the time it takes to obtain a path to an intended destination if it can be reached in an ad-hoc internet.

An IR also provides what may be defined as indirect ARP service to its attached hosts. This service consists of forwarding an ARP request from an attached host towards the MAC address specified by the host. To illustrate, consider that, in some cases, hosts attached to an IR through a LAN may be configured with a default router other than the IR(s) directly attached to the LAN. This may occur after a host is relocated or IRs are used to bridge two or more segments of a LAN. To permit a configured host to continue operating when its default router is not the IR(s) attached to the host's LAN segment, an IR is able to listen to frames (packets) sent to MAC addresses other than its own. If the IR has a routing-table entry for the MAC address, it can forward the packet accordingly. If the IR does not have a routing table entry for the MAC address, and the node with such an address has not been heard in the attached LAN, the IR may send a search query in order to find a path to the intended MAC address.

V. Routing-Table Updating

Figure 9:
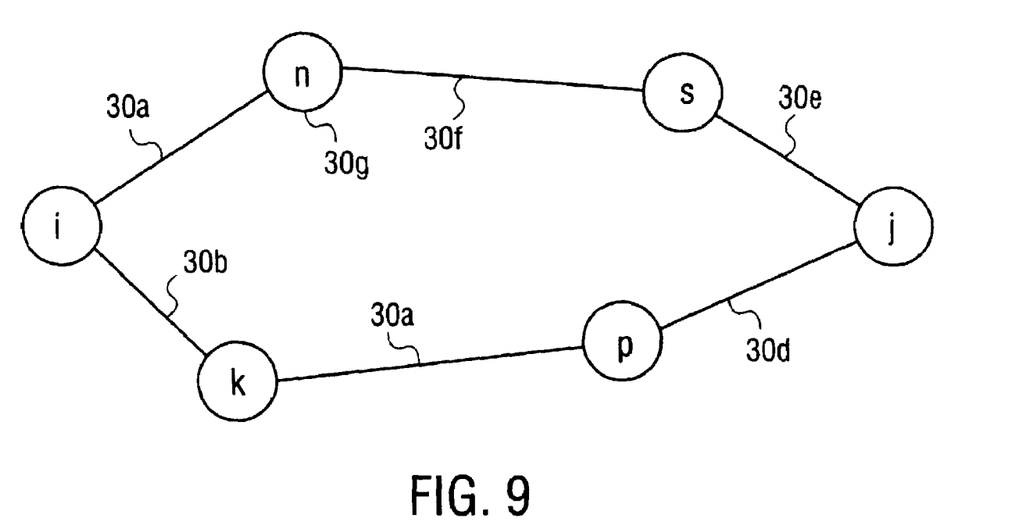
FIG. 9 illustrates a network having a topology useful for understanding the routing table update mechanisms found in an embodiment of the present invention.

Routing-table updates are important because they serve as the means by which routers (which generally use "path finding" algorithms to determine preferred paths-typically shortest paths) ensure that they are using truly preferred paths to destinations. To illustrate, consider the network topology shown in FIG. 9. In traditional approaches, a router i sets its next node to destination j to equal neighbor k only if the distances to j, and to every node in the path from k to j, through node k constitute the smallest distances for such destination j and for such intermediate nodes (e.g., p) in the path from k to j known at i among all the neighbors of node i. For AIR, however, a router i selects its next node to a destination j to equal neighbor k only if the following conditions are satisfied:

a) Every intermediate node in the path from k to j, reported incrementally by k to i and stored at i, satisfy the nodal condition required by i for its path to j, and b) For all of router i's neighbors, neighbor k offers the smallest distance to j and to every intermediate node along the path from k to j, which is reported incrementally by k to i and stored at i.

Furthermore, AIR extends the methodologies used in prior schemes for link-state routing. In such schemes, a router i may communicate to its neighbors the characteristics of the links (e.g., 30a and 30b) to each of its neighbors. A router that receives a link-state update from a neighbor may then propagate the update to its own neighbors (e.g., if the link-state update is more recent than the information maintained at the node) in one of two ways. The router may forward the update to all its neighbors other than the one sending the update, or the router may forward the update to all its neighbors if the link in the update is used by router i to reach at least one destination. A router then computes its preferred paths to destinations based on the updated information by running a shortest-path algorithm.

In AIR, however, in addition to the link-state updates, a router i communicates to its neighbors its own nodal characteristics (i.e., the node-state metrics of node i). A router that receives a node-state update from a neighbor propagates the update to its neighbors if the node-state update is more recent than the information maintained at the node. Routers then compute preferred paths to destinations running a shortest-path algorithm (e.g., Dijsktra's or Bellman-Ford's algorithm) modified to eliminate from the computation those nodes that do not satisfy router i's required value of nodal characteristics. The shortest-path algorithm may be implemented in a distributed manner over a hierarchical graph representing the connectivity of IRs (i.e., the nodes of the ad-hoc internet) and the IP networks they connect. Examples of nodal characteristics (or metrics) that may be communicated among nodes (and, hence used in shortest path computations) are presented below.

To expand on the above discussion then, an IR updates its routing table based on AIR control messages received from other IRs or messages sent by the neighbor protocol. The control messages that can cause an IR to modify its routing table are update messages or search queries from other IRs. As previously stated, the routing information contained in both update entries and query entries generally include the address (MAC address, IP address, or both), and the distance and predecessor to the destination along a preferred path. Because every IR reports to its neighbors the second-to-last hop in the shortest path to the destination, the complete path to any destination (called the implicit path to the destination) is known by the IR's neighbors, whether the destination is well-known in the ad-hoc internet or not.

When an IR receives an update message from a neighbor, it processes each update entry and ACK entry in order. Similarly, when an IR receives a reply to a search query, it processes each hop of the reported path one at a time and in the order in which the sender specifies them. Because IRs send routing information ordered according to their distances to destinations, it follows that an IR can safely execute the following path-traversal mechanism to determine if using a neighbor IR to reach a destination would result in a loop.

VI. Processing Update Messages

When an IR processes an update message from one of its neighbors, it processes each update entry reported by its neighbor IR in the order in which it was sent in its neighbor's update message. For each update entry in the message, the IR checks whether the implicit path reported by a neighbor IR to a given destination is free of loops, and checks the consistency of predecessor information reported by all its neighbors.

When an IR processes an update or reply entry reported by neighbor k regarding destination j, the IR updates the path information from neighbor k that it maintains in its distance table with the new path information reported by the neighbor. In addition, the IR determines if the path reported by any other neighbor i to the same destination includes neighbor k. If that is the case, then the IR substitutes the old path information reported by neighbor n regarding the subpath from k to destination j with the path information reported by neighbor k regarding its path to destination j.

As discussed above, to ensure that the implicit paths stored in an IR's routing table are loop free, the IR chooses a neighbor n as its successor (next hop) towards a destination if, and only if, (1) the distance to the destination through that neighbor is the smallest attainable distance to the destination through any neighbor, and (2) the distance to each intermediate hop in the path from the IR to the destination through neighbor n is the smallest attainable distance to that destination through any neighbor.

To determine the second condition above, the IR traverses the implicit path reported by its neighbor through the predecessor information. If a given intermediate hop along the path to a destination satisfies the second condition for loop freedom, the IR then checks if the same condition is true for the predecessor specified for that destination by its neighbor n. Hence, the IR carries out a path traversal from the destination back to itself to ensure that its neighbor n provides the shortest path to the destination and every intermediate hop in the path to the destination. The path-traversal tag is used to limit the processing required for an IR to accomplish this path traversal. More specifically, the tag allows the IR to stop the path traversal as soon as it reaches an intermediate hop that has a tag value equal to correct, which indicates that the path from itself to that hop through the same neighbor has been checked successfully before; or a value equal to error, which indicates that a loop has already been discovered along the proposed path to the destination.

VII. Processing Search Queries

Search queries are flooded throughout the ad-hoc internet on a best-effort basis in order for an IR to find a destination that is not known by all IRS of the ad-hoc internet. Because IRs need not keep a routing-table entry for every possible source of a search query, IRs cannot decide when to forward a query based on their shortest paths to the origins of the queries. Accordingly, IRs relaying queries should maintain a cache of the search queries that they have forwarded recently. The minimum information a relay IR requires to discard copies of the same query arriving from multiple neighbors then becomes the address of the origin of the query and the sequence number assigned by the origin to the query.

When an IR receives a search query, it first determines if the query is IR-level or host-level, and whether it has already processed the query by consulting its query cache. In the case of an IR-level query that is new, the IR either forwards the query if it does not know the route to the MAC or IP address specified in the query, or replies to the query if it has a current path to the destination.

In the case of a host-level query that is new, the IR replies to the query if it can provide a path and an address mapping for the destination. If the IR does not have the information, it first sends an ARP request locally (e.g., across a local LAN such as LAN 26 in FIG. 1) and replies to the query if it obtains a positive response from an attached host; otherwise, the IR forwards the query to other IRs, if it has any other neighbors.

When an IR forwards a search query, it adds a path entry for itself to the forward path information contained in the query. This path entry includes: the IP or MAC address of the IR; its predecessor, which consists of the IP or MAC address of the IR from which the query was received; the distance from the origin of the query to the IR; and the dissemination-type flag for the IR forwarding the query. The IR computes the distance from the origin of the query to itself by adding the cost of the incident link from its neighbor to the distance reported in the forward path of the query for the neighbor that forwarded the query.

When an IR knows a path to the destination requested in a search query, it sends a reply to it specifying the complete path from the origin of the query to the destination. This path is simply the concatenation of the forward path specified in the query being answered and the path from the IR answering the query to the intended destination.

To permit search queries to be IR-level or host-level in a way that is completely transparent to the hosts of an ad-hoc internet, one embodiment of the AIR protocol treats new ARP requests as IR-level queries and retransmitted ARP requests as host-level queries, and uses a counter to limit the number of host-level queries sent for the same IP address during a time interval of a few seconds. In addition to consuming bandwidth, sending too many host-level requests would impact the hosts of an ad-hoc internet negatively after network partitions and/or IR or host failures.

Figure 10:
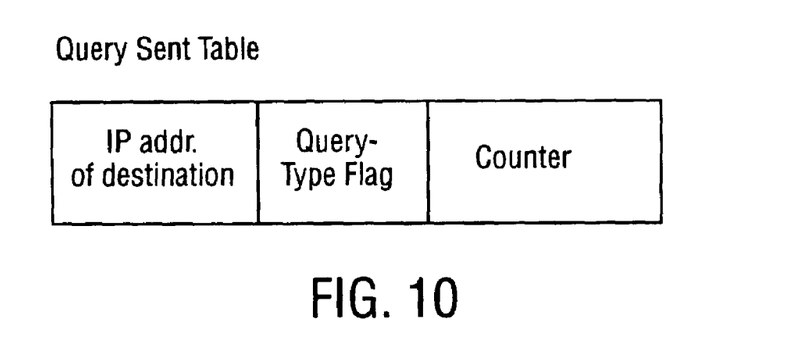
FIG. 10 illustrates an example of a query sent table maintained by a node of an ad-hoc network in accordance with one embodiment of the present invention.

When a host sends a new ARP request to its attached IR, the IR originates an IR-level query and keeps a copy of the query in a query-sent table for a query-timeout interval. As shown in FIG. 10, an entry in the query-sent table includes the IP address of the intended destination, a query-type flag stating whether the entry corresponds to an IR- or host-level query, and a counter. The query-timeout interval is long enough for replies to the query to come back to the originating IR if there are other IRs with a path and address mapping to the requested destination, but is smaller than the ARP request timeout at the requesting host.

If the query-timeout expires for an entry in the query-sent table, the IR increments the counter of the entry in its query-sent table, retransmits the IR-level query, and restarts its query-timeout timer. If no reply is received to the retransmitted IR-level query, the IR changes the value of the query-type flag (e.g., to one) to reflect the fact that the next retransmission of the query must be a host-level query. The query-timeout is set to equal an ARP request timeout to allow the attached host to retransmit its ARP request. The IR does not retransmit a search query for the same address unless it receives an ARP request from its attached host. If the IR receives an ARP request for an IP address whose entry in the query-sent table has a query-type flag set to one, the IR sends a host-level query, increments the counter for the entry, and starts a query-timeout timer with a value long enough for the remote host to reply to the query.

An entry remains in the query-sent table of an IR for a long timeout period that should be larger than the ARP request timeout at the attached hosts, so that the attached host can retransmit an ARP request if necessary. In one embodiment of AIR, a host-level query is retransmitted only twice, after which an IR simply drops ARP requests from an attached host. This limits the traffic due to flooding of search queries over the ad-hoc internet due to ARP requests and also limits the number of remote ARP requests reaching the hosts.

VIII. Processing Replies to Search Queries

Replies specify complete paths from origins of queries to destinations, because relay IRs do not maintain an accurate account of the queries that they have forwarded; the cache maintained at each IR is only meant to reduce the possibility of an IR forwarding the same query multiple times. Accordingly, an IR must decide how to process a reply it receives from a neighbor based entirely on the information contained in the reply and not the contents of the cache it keeps for queries. More specifically, an IR receiving a reply for a query forwards the reply towards the origin of the query if it is listed in the forward path from the origin to the destination specified in the reply.

In addition to forwarding replies to the proper IRs when applicable, IRs also use replies to update their routing tables. An IR receiving a reply treats each path entry with the dissemination-type flag set in the path specified in the reply as an unreliable update entry. More precisely, if a path entry in a reply refers to a well-known destination, the IR updates its distance and routing tables as if the entry were an update entry, prepares its own routing-table update if needed, but does not send an acknowledgment. In addition, an IR treats each path entry with the dissemination-type flag reset as a temporal routing-table entry. The IR adds the routing information to its routing table, and keeps the information for a period of time.

As the replies from IRs travel back to the origin of the query, the originating IR starts obtaining one or more paths to the intended destination. In one embodiment of AIR, the IR originating a search query does not keep any state regarding the search queries that are still pending replies. The sequence number assigned to a search query is used only to limit the number of replicas of the same query that relay IRs forward. This design assumes that the hosts attached to the IRs will be the ones requesting the transmission of more queries if they do not obtain any reply from their attached IRs after a timeout. In practice, the timeouts used in hosts are much longer than the time needed for queries and their replies to traverse an ad-hoc internet.

An IR originating a search query may receive as many replies as there are IRs in the ad-hoc internet that know about the destination and are reached by the query through paths of IRs that do not know about the destination. In one embodiment of AIR, IRs maintain routing-table entries for either well-known destinations that every IR must know, or on-demand destinations that IRs know only temporarily through the replies to queries for those destinations. Therefore, it is anticipated that the most replies an originating IR will receive equals the number of neighbor IRs that a destination IR has, if the destination is an IR or a network, or as many replies as IRs are attached to a host, if the destination is a specific host. In most cases, on-demand routing will serve host-specific routes. When an IR that originated a search query receives the first reply to the query, it should erase the entry for the query in its query sent table.

IRs maintain on-demand routing information for a finite period of time, and add routing-table entries to their routing tables with information they receive in replies to search queries, without notifying their neighbors of such changes to their routing tables. An IR keeps a routing-table entry with a zero value of the dissemination-type flag for a finite time period equal to a maximum entry age, which in one embodiment may be set to approximately 3 minutes or another appropriate time. The IR may reset the age of the entry (e.g., by updating an associated age field, which may be part of each routing table entry as shown in FIG. 3) each time it forwards a packet for the destination or receives a new reply with information about the destination.

IX. Reliable and Unreliable Distribution of Routing Information

The reliable transmission of update messages is implemented by multicasting update messages, and then acknowledging these with messages carrying both updates and acknowledgments to one or more other update messages.

After receiving an update message free of errors, a node is required to acknowledge it. An update message may be retransmitted if acknowledgments are missing after a finite timeout equal to the update interval. An IR keeps track of which neighbor IRs have not acknowledged an update message by means of its MRL. Each retransmission of an update message may specify the subset of neighbors that need to acknowledge the message.

In some cases, the information contained in an update message may be obviated by a subsequent update message. In one embodiment of AIR, old update messages are therefore discarded, and all the up-to-date path information contained in the old update messages are included in the new update message, together with the new information the new update message must convey to all neighbor IRs. In other schemes, the new update message may include information regarding which portions of old update message to discard, etc. An IR may receive an acknowledgment to an update message that has been replaced by a more recent update message; in such a case, the IR simply ignores the information in the acknowledgment.

In contrast to the way in which update messages are exchanged, in one embodiment of AIR search queries and their replies are sent unreliably among IRs. The IRs originating search queries retransmit such queries only once, and it is up to the hosts to persist in finding destinations for which there are no routing table entries at each IR. As noted above, however, AIR preferably limits the number of search queries allowed over the ad-hoc internet for a given remote destination.

X. Simple Network Configuration Through AIR

With traditional Internet routing protocols, a router has to be configured with the IP addresses and masks of the attached LANs, as well as its own address and mask. Further, hosts attached to routers through a serial link or a LAN have to be configured with their IP address and mask and the IP addresses of their default routers. This amount of configuration information is required in existing Internet routing solutions because Internet routing protocols require IP addresses to accomplish routing. Therefore, Internet routers cannot start forwarding data to destinations until they are assigned their proper IP addresses and they can only send data towards IP destinations; which means that hosts must be properly configured with IP addresses before routers can start forwarding data to them.

AIR simplifies the configuration of hosts and IRs in the ad-hoc internet because it permits IRs to use both MAC and IP addresses to establish paths to destinations. AIR thus enables the implementation of a simple Dynamic IR Configuration Protocol (DICP) and permits IRs to start forwarding data for hosts immediately after they are turned on.

As mentioned above, in the ad-hoc internet each IR registers with an AirHead, i.e., an IR that interconnects the ad-hoc internet to the rest of the Internet, such as IR 16a in FIG. 1. An AirHead is configured with an IP address, LAN sub-networks for attached LANs, and a default router address for the wired segment to which it attaches to interconnect to the rest of the Internet. The AirHead then receives an IP sub-network for the ad-hoc internet it serves.

The AirHead (e.g., IR 16a) may use a standard Internet routing protocol (e.g., RIP or OSPF) over the wired LAN (e.g., LAN 20) connecting to its default router (e.g., router 18) to advertise its sub-network (e.g., 12a and/or 12b) to the default router. The AirHead is the only IR that needs to be configured in this traditional approach, because it is the only IR that must use standard Internet routing mechanisms to interconnect to the rest of the Internet.

Other IRs (e.g., 16c) may obtain an IP address and domain name from their associated AirHead (e.g., 16a), and may serve DHCP (Dynamic Host Configuration Protocol) packets from attached hosts (e.g., 22a and/or 22b). The DICP provides mutual authentication between new IRs and AirHeads, which can be accomplished by a packet-limited dialogue between the IR and AirHead to exchange certificates and public keys, and authenticate identities. To save address space or permit installation before a global IP network assignment is obtained, AirHeads can use a private IP address space to assign IP addresses to IRs and hosts. This, of course, makes the hosts and IRs in the ad-hoc internet invisible to the rest of the Internet; accordingly, the AirHead must provide the translation of private IP addresses to the IP address space allocated to the ad-hoc internet it serves. Importantly, however, the operation of AIR does not change with the type of IP addresses (public or private) used in an ad-hoc internet. With the services provided by AirHeads and the DICP, and given that AIR uses both MAC and IP addresses for routing, IRs can start operating after they are turned on. Immediately after startup, the IRs can start sending search queries in response to ARP requests.

XI. AIR Routing Metrics

As indicated above, most network routing protocols operate on "metrics" to determine the best path or paths for data traffic to take between source and destination nodes. These metrics are most often "link-state" metrics, which give an indication of the desirability (or inversely, the "cost") of routing traffic over a particular link. The simplest link metric is to give each link a cost of "1", which will cause the routing algorithm to choose paths that take the shortest number of links (or "hops"). Another common link metric is the delay across the link, averaged over some recent history and typically including both queuing and transmission delay. This will result in the routing algorithm choosing paths of minimum delay. Less common is the use of "node-state" metrics, which gives an indication of the cost to route packets through a particular node. To effectively route traffic in the self-configuring, multi-hop wireless network environment of an ad-hoc network, the AIR protocol combines traditional link-state metrics with new types of both link- and node-state metrics. Of course, these routing metrics may find use in other types of networks as well.

The link-state metrics used by AIR include LinkNetImpact, LinkEnergy and LinkQuality, each of which is described in detail below.

LinkNetImpact is a metric that provides the cost in interference over time to an IR's neighbors per data bit and may be measured in, (normalized-number-of-nonintended-receiving-nodes)
*(secs per bit).

The normalized number of nonintended nodes gives an indication of the number of other nodes in the network, other than the intended receiver-node(s) for this link, which would be interfered with by a transmission over this link. For example, in the ad-hoc network 10 shown in FIG. 1, when IR 16e transmits over a path including link 24c to reach Internet 14 through IRs 16d, 16c and 16a, that transmission may have the unintended effect of interfering with receptions by IR 16f (and potentially other transmissions and receptions by IRs in the sub-network 12b).

Because some nodes may be closer to the transmitter than others, this "normalized" number of neighbors may be computed in a number of ways. For example, (1) by including only those nonintended nodes that would receive the transmission at an RF power above a certain threshold power level; (2) by summing the interference levels of all nonintended nodes with the interference level at each node equal to the received RF power level of transmissions over this link by each of these nodes; or (3) a combination of methods (1) and (2).

To estimate the LinkNetImpact for use of a particular link, nodes may tag each (or selected) transmissions with the RF transmit-power used for that transmission. Any individual node may then measure the received signal strength of tagged transmissions made by its nearby nodes, and compute the difference between the transmit power (tagged in the packet) and the received signal strength. This difference will estimate (depending on measurement accuracy) the RF path-loss from the transmitting node. Periodically then (depending on rate of node mobility or other environmental dynamics), the node may relay the computed RF path-loss from each of its nearby nodes back to its neighbors. Given the path-loss to each of its nearby nodes, and given the transmitted power and link-date-rate (bits per sec) used for a link to a particular neighbor node, the transmitting node can compute the LinkNetImpact for use of this link.

Note that transmit power and link-date-rate, used for a node's different links, may vary from link to link. These will, in general, be set by link management protocols according to the data-rate and transmit power that give reasonably reliable use of that link. In fact, the link manager may provide the routing algorithm (e.g., AIR) with multiple choices of links to the same neighbor that tradeoff lower transmit power (with lower LinkNetImpact) for LinkQuality for instance.

LinkNetImpact differs from prior schemes (e.g., Jim Stevens, Rockwell; Michael Pursley, Univ. of Illinois) where network "interference" was used as a link metric for routing algorithms, in that a measure of the link utilization (e.g., in secs per bit) was not included in such schemes.

LinkEnergy is a metric that provides the node energy consumed per data bit for transmissions over a selected link and its use recognizes that for mobile, portable, or unattended wireless nodes that may be solar- or battery-powered, the power used for transmissions over each link can be a significant consideration. The units for this metric are Energy (in Joules or Watts)*(secs/bit).

This metric may include all additional power not normally consumed for the node in its quiescent state (when not actively transmitting). This will include the power to transmit over the selected link, adjusting for the RF transmit power setting used for the link, and may or may not include the power required to put the node in an active state (if necessary). Given such a link metric, the routing algorithm can choose paths that minimize the total energy per bit communicated through the network, or may use this metric in combination with others to achieve a combined routing optimization.

In the past (e.g., Theresa Meng, Stanford), algorithms for minimum energy routing have been introduced but such schemes did not consider the speed of the links (which may be adaptive or selectable).

LinkQuality is a metric that provides a combined indication of the desirability of a link in terms of other basic metrics such as LinkReliability, LinkMaxTransmissionUnit (LinkMTU) size, LinkEnergy, and LinkRcvSignalStrength. Although many of these basic metrics may be used elsewhere as sole determining metric criteria, the combination and the way that the metric is used in AIR is unique. Such a metric may be passed as part of a routing table update message (e.g., as part of the distance information described above). Thus, the metric may be used for routing decisions. The metric may also be used in determining whether to add a node as a neighbor at all, e.g., depending upon whether the corresponding link exhibits a better LinkQuality than an existing path to the target node.

In the self-configuring, multi-hop wireless environments common to ad-hoc networks, links to neighbors must be automatically selected by the nodes. This is in stark contrast to typical routing algorithms where the links to neighbor nodes are fixed, or in cellular wireless networks and conventional wireless LANs where selection of links is drastically simplified by the limitation that each mobile system is limited to one or more links with pre-determined "base-station" nodes.

There are a number of reasons why it may desirable to limit the list of actively used links to neighbor nodes. Each active link used by a node consumes memory resources within that node for such purposes as packet queues and maintaining link statistics. Each active link used by a node often requires additional fields in control packets in the MAC, Link, and/or Routing protocols, translating to additional network overhead traffic. In addition, by limiting a node's active links to only the closest nearby nodes, overall network efficiency is often increased due to the fewer number of nodes interfered with by transmissions (see LinkNetImpact metric above).

In AIR, a LinkQuality metric may be computed for each link being used by a node, based on some combination of traditional metrics (see above for some examples; in other cases, combinations of LinkNetImpact and/or LinkEnergy together and/or with the reliability of the link may be used as well). This metric may then communicated throughout the network as part of AIR's update packets. An important aspect of the use of this metric is making the decisions on which links to keep. Specifically, in making a decision on whether or not to add or delete a particular candidate link to a neighbor from it's actively used neighbor links, a node will:

1. Examine the node's local routing information to determine whether alternate paths exist to the neighbor, using a sequence of one or more other links through the network.

2. Compute the LinkQuality of the candidate link (using probing or other methods to compute the basic metrics required for the LinkQuality metric).

3. If no alternate path exists to this neighbor node, accept the candidate link into this node's list of active links.

4. If one or more alternate path(s) do exist to the neighbor node, then compare the LinkQualities of the links along each of the alternate path(s) with the LinkQuality of the candidate link. If the LinkQuality of the candidate link compares favorably with the links on the alternate path(s), then accept the candidate link.

In alternative situations, after examining the local routing information and performing any comparisons, if the LinkQuality is determined to be above a defined threshold value, then the candidate link may be accepted.

Depending on the metrics used to compute the LinkQuality, favorable comparison may mean that the candidate link's LinkQuality is equal to or better than the link with the worst LinkQuality along the alternate path. Alternatively, favorable results may mean that the candidate link's LinkQuality is equal to or better than some other PathQuality function of the links along the alternate path. For example, if LinkQuality was simply equal to the probability of success for each packet transmitted over the link, then the following PathQuality function may be appropriate to use for comparison purposes:

$$PathQuality = \Pi_i [LinkQuality(i)],$$

where LinkQuality(i) is the LinkQuality over the $i^{th}$ link along the alternate path. Thus, the function computes the probability that a packet with one transmission attempt over each link on the alternate path will successfully reach the destination (neighbor node).

If the number of active neighbor links for each node is limited, then steps 3, 4, and 5 above, can be modified to add a new candidate link and reject an existing link (if necessary to meet the limitation on the number active links to neighbors). This may be achieved by comparing the LinkQuality and alternate path(s) of the new link with the LinkQualities, and alternate paths(s) of the existing links. For example, each existing link's LinkQuality can be increased (or weighted) by some value (to favor existing links), and then these can be compared with the LinkQuality of the candidate link. The link with the worst LinkQuality value (as weighted, if appropriate) may be deleted (or simply not accepted in the case of the candidate link). Excluding existing links that have no alternate path, or only poor alternate paths (e.g., as measured according to the PathQuality function discussed above) can further extend this method.

In prior schemes (e.g., Beyer, Shacham; BBN), algorithms for selecting neighbor links were presented which limit the number of active links for each node. However, these schemes did not make use of link-state information available from a link-state routing protocol such as AIR.

Node-state metrics that may be used by AIR (e.g., as part of routing table update messages) include NodePowerType, NodePowerState and NodeAnchorFlag. These measures are discussed in turn.

NodePowerType is a metric that indicates the type of power available to a node. For example, values may include Unlimited-Power, Battery-Power (with the power-capacity of the battery as an optional argument), and/or Solar-Power. This metric can be included in the update packets of the routing protocol and used by the routing algorithm to steer packets towards power-capable nodes when allowed by network or traffic stream performance goals.

NodePowerState indicates the current state (e.g., "up", "standby", "down") and/or power schedule of a node (i.e., the power-conservation state of a node). For example, values may include Powered-Up, Powered-Standby, and Powered-Down. This metric may be included in the update packets of the routing protocol and used by the routing algorithm to steer packets towards nodes that are in more active states. This allows packets to follow paths of lower delays (because nodes that are in relatively inactive states are typically sensing the channel less often, and thus, forwarding through these nodes will take longer). Further, the scheme allows nodes that are powered-down to remain in that state rather than waking them up to forward packets.

NodeAnchorFlag is a metric that may be used to assist the user with network installation and/or maintenance. In a self-configuring, multi-hop network, a node's connectivity with the rest of the network cannot be determined simply by deciding whether it has links with one or more nodes (as is the case for cellular or wireless LAN networks, where each node is required to have a direct link with a "base-station" node). Therefore, AIR includes this metric, which indicates whether or not a node has been selected by the user to serve as an "anchor" for the network. By passing the state of this metric to the other nodes in the network, each node is able to provide an indication to the user as to whether or not it has a path (possibly over multiple hops) to one or more network anchors. For instance, this state may be displayed on an LED or other display, indicating whether or not a node is currently "anchored," thus facilitating network installation.

Thus, if a single anchor node is selected by the user, then as long as each other node has a path (over one or more hops) to the anchor node (i.e., each network node is anchored), the user can be sure that each node also has connectivity with every other node in the network. Also, by designating the node(s) with connectivity to the Internet as the network anchor(s), then all anchored nodes will also have connectivity to the Internet. An anchor then may be thought of a node that has or provides connectivity to a server or a service for the computer network or a node that monitors connectivity, e.g., to the Internet or some other resource, for the computer network.

Thus a unified routing scheme for ad-hoc internetworking has been described. Although the foregoing description and accompanying figures discuss and illustrate specific embodiments, it should be appreciated that the present invention is to be measured only in terms of the claims that follow.

What is claimed is:

1. A method, comprising:
   maintaining local routing information by a first node of a computer network;
   examining the local routing information maintained by the first node of the computer network to determine whether alternate paths exist to a neighbor node of the first node, using a sequence of one or more links other than a candidate link through the computer network;
   computing a link quality of the candidate link;
   if no alternate path exists to the neighbor node, accepting the candidate link; and
   if one or more alternate paths do exist to the neighbor node, then comparing link qualities of the links along each of the alternate paths with the link quality of the candidate link and accepting the candidate link if the link quality of the candidate link compares favorably with the link qualities of the links on the alternate paths.

2. The method of claim 1 wherein a favorable comparison is one wherein the link quality of the candidate link is equal to or better than a link quality of a worst one of the link qualities of the links on the alternate paths.

3. The method of claim 1 wherein a favorable comparison is one wherein the link quality of the candidate link is equal to or better than a path quality function of the links along the alternate paths.

4. The method of claim 1 further comprising the step of accepting the candidate link if the link quality of the candidate link exceeds a defined threshold value.

5. The method of claim 3 wherein the link quality of any link in the computer network is equal to the probability of success for each packet transmitted over that link.

6. The method of claim 3 wherein the path quality function of the links along the alternate paths comprises the products of the link qualities for each the links on the alternate paths.

7. A method, comprising:
   maintaining local routing information in a first node of a computer network;
   identifying a second node of the computer network as a neighbor node;
   selecting a link as a candidate link, wherein the link corresponds to one hop in the computer network;
   determining whether any alternate paths exist that do not include the candidate link within the alternate paths, wherein the alternate paths comprise a plurality of links;
   if no alternative paths exist, accepting the candidate link; and
   if an alternative path exist, performing the following steps
      computing a first link quality of the candidate link,
      computing a second link quality of the plurality of links of the alternate path, and
      accepting the candidate link if the first link quality compares favorably to the second link quality.

* * * * *